United States Patent [19]

Labib et al.

[11] Patent Number: 4,517,117

[45] Date of Patent: May 14, 1985

[54] STABILIZERS FOR CED COMPOSITIONS

[75] Inventors: Mohamed E. Labib, Princeton; Chin C. Wang, Hightstown, both of N.J.

[73] Assignee: RCA Corporation, Princeton, N.J.

[21] Appl. No.: 622,648

[22] Filed: Jun. 20, 1984

[51] Int. Cl.³ .............................................. H01B 1/06
[52] U.S. Cl. .................................. 252/511; 524/178; 524/179; 524/180; 524/181; 524/182; 369/286; 369/276; 346/137
[58] Field of Search ...................... 252/511, 510, 506; 524/495, 496, 567, 174, 175, 178–182; 274/41 A, 1 R; 523/174; 358/342, 344; 264/104, 105; 369/126, 276, 280, 286, 288; 428/64, 65; 346/137

[56] References Cited

U.S. PATENT DOCUMENTS

| | | | |
|---|---|---|---|
| 4,228,050 | 10/1980 | Martin et al. | 260/23 X |
| 4,275,101 | 6/1981 | Wang et al. | 369/286 |
| 4,280,941 | 7/1981 | Datta et al. | 252/511 |
| 4,330,583 | 5/1982 | Datta et al. | 428/65 |
| 4,351,747 | 9/1982 | Miyamoto et al. | 252/511 |
| 4,355,062 | 10/1982 | Wang et al. | 428/64 |
| 4,378,310 | 3/1983 | Datta et al. | 524/495 |
| 4,383,961 | 5/1983 | Nyman et al. | 264/107 |
| 4,384,055 | 5/1983 | Okuda et al. | 524/495 |
| 4,390,459 | 6/1983 | Koral et al. | 252/511 |
| 4,399,061 | 8/1983 | Sickert | 252/511 |
| 4,412,941 | 11/1983 | Probst et al. | 252/511 |
| 4,416,807 | 11/1983 | Datta et al. | 252/511 |
| 4,465,615 | 8/1984 | Hata et al. | 252/511 |
| 4,465,616 | 8/1984 | Nelson et al. | 252/511 |
| 4,465,617 | 8/1984 | Whipple et al. | 252/511 |

Primary Examiner—Josephine L. Barr
Attorney, Agent, or Firm—Birgit E. Morris; R. Hain Swope

[57] ABSTRACT

An improved conductive molding composition for the preparation of high density capacitance electronic discs is disclosed. The disclosed compositions are improved by the replacement of most or all of the conventionally used stabilizer ingredient with a tin mercapto ester or alkyl mercaptide represented by the formulae

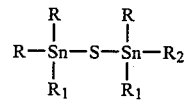

and

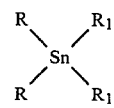

wherein R is a straight-chain alkyl radical having 4 to 8 carbon atoms;
$R_1$ is selected from $-S-CH_2-COOR_3$ and $-S-R_3$;
$R_2$ is R or $R_1$; and
$R_3$ is a straight-chain alkyl radical having from 8 to 18 carbon atoms.

18 Claims, No Drawings

STABILIZERS FOR CED COMPOSITIONS

This invention relates to improved stabilizers for conductive molding compositions utilized to prepare high density information discs known as capacitance electronic discs ("CEDs").

BACKGROUND OF THE INVENTION

Martin et al, U.S. Pat. No. 4,228,050, discloses a complex molding composition for the compression molding of high density information records, such as CEDs. This composition, in essence, comprises a thermoplastic resin, preferably a vinyl chloride-based polymer or copolymer, and sufficient finely divided conductive carbon black to provide capacitive playback of discs prepared therefrom. Typically, such compositions have a bulk resistivity of below about 500 ohm-cm at 900 mHz. The composition disclosed by Martin et al. additionally contains both liquid and solid additives such as stabilizers, lubricants, plasticizers, processing aids and the like. In addition to the function of these ingredients in the formulation, e.g. as a lubricant, the selection of each required consideration of their stability during the processing and molding of the formulation and the possibility of reactions among any two or more ingredients and/or their degradation products.

It will be appreciated that, because of the numerous possibilities for reactions in a large formulation such as disclosed by Martin et al, particularly during the heat and pressure of the molding process, it would be advantageous to significantly reduce the number of ingredients therein. Datta, in copending application Ser. No. 452,915, filed Dec. 12, 1982, and Labib et al, in copending application Ser. No. 549,560, filed Nov. 7, 1983, now abandoned, disclose improved formulations containing fewer ingredients. The simplified formulations disclosed in these applications additionally possess other advantages such as avoiding the need for a conventional washing step after pressing.

In accordance with this invention, specific stabilizers have been found which further improve CED conductive molding compositions.

SUMMARY OF THE INVENTION

Conductive molding compositions for CEDs are improved by the inclusion of certain tin mercapto esters and alkyl mercaptides as stabilizers.

DETAILED DESCRIPTION OF THE INVENTION

The improved stabilizers incorporated into the conductive molding compositions for capacitive electronic discs ("CEDs") in accordance with this invention are tin mercapto esters and alkyl mercaptides represented by the formulae

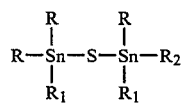

and

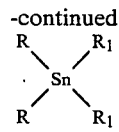

wherein R is a straight-chain alkyl radical heaving 4 to 8 carbon atoms;

$R_1$ is selected from —S—$CH_2$—$COOR_3$ and —S—$R_3$;

$R_2$ is R or $R_1$; and $R_3$ is a straight-chain alkyl group having 8 to 18 carbon atoms.

Preferred stabilizer compounds in accordance with this invention are those of the above formulae wherein R is butyl or octyl, particularly the latter, $R_2$ is —S—$CH_2$—$COOR_3$ and $R_3$ contains from 10 to 14, particularly 12 to 14, carbon atoms.

The tin stabilizers of this invention are superior to stabilizers previously utilized in CED conductive molding compositions in two particulars. First, they are substantially less sensitive to moisture than the tin esters previously used. This is because the tin-sulfur bond hydrolyzes much less readily than does the tin-oxygen bond. Second, when the subject compounds do hydrolyze, the resulting fragments are substantially less water soluble than the hydrolysis products of previously used stabilizers. Because the fragments are relatively insoluble, they do not bleed to the surface of the CED over a relatively short period of time. These differences are significant in terms of stability of CEDs containing the subject stabilizers, particularly over an extended period of time and under conditions of high temperature and humidity.

The fact that the fragments of the subject stabilizers which are formed when hydrolysis does occur, for the most parts will not bleed to the surface is significant in the simplified formulations refered to above which do not have to be washed after pressing. It is particularly important for the stabilizer in such formulations to remain intact, and not cause any undesirable matter to accumulate on the disc surface.

Conductive molding compositions used to prepare CEDs in accordance with this invention contain from about 1 to 5, preferably from about 2 to 3, percent by weight of the subject stabilizers. The subject stabilizers partially or totally replace tin stabilizers previously used such as organotin maleates, e.g. dibutyltin maleate, and dibutyltin-β-mercapto-propionate. It has been found that it is advantageous in certain formulations to combine one of the subject improved stabilizers with a minor amount, i.e. from about 5 to about 40 percent by weight, of the total stabilizer present of the previously used stabilizers, especially dibutyltin-β-mercapto-propionate.

The resin component of the subject CEDs can be a homopolymer or copolymer of vinyl chloride, or a mixture thereof as disclosed by Martin et al., a homopolymer of styrene, or an acrylic monomer, or their copolymers as disclosed by Datta et al. in U.S. Pat. No. 4,416,807, or the like. Poly(vinyl chloride) is presently preferred for the subject discs. A particularly suitable resin is a vinyl chloride homopolymer commercially available from B. F. Goodrich Company as Geon 110×346. This resin has a weight average molecular weight of approximately 84,000, a number average molecular weight of approximately 38,000 and a Tg of approximately 88° C.

Suitable conductive carbon blacks include low density blacks such as Ketjenblack EC of the Armak Company or CSX-200A of Cabot Corporation. Such carbon blacks have a low bulk density, i.e. about 140–160 grams per liter, an average particle size of about 300 angstroms, a high surface area and a high proportion of voids within the particles as measured by dibutylphthalate absorption.

The CED's of this invention contain from about 70 to 85, preferably from about 78 to 80, percent by weight of the resin; from about 12 to 20, preferably from about 14 to 17, percent by weight of conductive carbon black particles; and up to about 10, preferably from about 1 to 7, percent by weight of additives. In addition to the above-named stabilizers, the CED's of this invention contain additives selected from the following groups.

Suitable lubricants include fatty acids such as stearic acid, esters thereof, polyfunctional acid and alcohol esters, soaps including calcium and zinc stearates, fatty acid amides such as stearic acid amide, oleamide and ethylene-bis-stearamide, silanes such as dimethylsiloxane, commercial mixed organic ester preparations such as Loxiol 7109, available from Henkel International Gmbh, and the like. The subject CEDs suitably contain from about 0.5 to about 3, preferably from about 0.75 to 1.5, percent by weight of a lubricant.

The conductive molding compositions of this invention include from about 1 to 5, preferably from about 2 to 3, percent by weight of a plasticizer which may be a liquid, e.g., low molecular weight phthalate, or a solid, e.g., glyceryl tribenzoate. A particularly suitable plasticizer in accordance with this invention is diundecyl phthalate, a liquid.

In addition, the subject compositions may optionally contain, for example, a titanate dispersant, i.e. tri(dioctylpyrophosphato)titanate, an organosilicone having polar groups, e.g. 1.3-bis(4-hydroxybutyl)-1,3-didecyl-dimethyldisiloxane, or a polyalkylene oxide modified dimethyl polysiloxane available from Union Carbide Corporation as UL-722, or a flow modifier as a processing aid. A presently preferred product is a solid acrylic flow modifier available from Rohm & Haas Co. under the trademark Acryloid K-175.

Suitably, these additives, when present, are added to the subject CEDs in an amount from about 0.5 percent by weight for an individual compound to about 4 percent by weight for the total of members of the group. The solid flow modifier is suitably present in from about 1 to 1.5 percent by weight.

The individual components of the conductive molding composition are comminuted to a fine particle size. In particular, the conductive carbon black, after comminution, contains substantially no particles larger than about 10 micrometers. Commercial grinding apparatus such as air jet pulverizers is suitable for this purpose. The solid ingredients are comminuted individually or in groups of two or more. The pulverizing procedure may be carried out separate from or ancillary to blending of the solid ingredients. Any large particles, e.g. carbon black agglomerates, that remain after the comminution can be removed by physical separation, e.g. sieving the blend. The liquid ingredients, if any, are suitably added thereto by spraying as an ultra fine mist.

The blended conductive molding composition is preferably thermally processed, i.e. it is heated under high shear to form a melt having the carbon particles uniformly dispersed therein. Thermal processing is preferably carried out by extruding the conductive composition in a Buss Condux Kneading Extruder, or other suitable apparatus. The composition is passed through a die, pelletized and stored. Although a simplified conductive composition, such as disclosed by Dixon et al., in copending application Ser. No. 556,354, filed Nov. 29, 1983, may be molded directly after comminution and blending, thermal processing is preferred for the subject invention. High density information discs, i.e. CEDs, are prepared from the conductive molding composition, whether thermally processed or not, by compression molding at about 325°–380° F. (163°–190° C.).

The surface of the subject CEDs is suitably lubricated with, e.g. a fractionated methylalkyl siloxane such as disclosed in Wang et al, U.S. Pat. No. 4,275,101, issued June 23, 1981, preferably doped with an additive such as disclosed in Datta et al, U.S. Pat. No. 4,330,583, issued May 18, 1982, or Wang et al, U.S. Pat. No. 4,355,062, issued Oct. 19, 1982. This composition is suitably applied to the disc as a fine mist.

CEDs prepared in accordance with this invention are characterized by resistance to both hydrophobic and hydrophilic solvents, excellent lubricant spreading mobility for lubication of the surface and excellent video and audio playback properties.

The following Examples further illustrate this invention, it being understood that the invention is in no way intended to be limited to the details described therein. In the Examples, all parts and percentages are on a weight basis and all temperatures are in degrees Celsius, unless otherwise stated.

EXAMPLE 1

A conductive molding composition was prepared by combining in a Welex mixer 77.0 parts of Geon 110×346, poly(vinyl chloride)resin of the B. F. Goodrich Company; 1.25 parts of dibutyltin-β-mercapto-propionate, Thermolite T-35 of M & T Chemical Company; 1.0 part of Acryloid K-175; 0.75 part Loxiol 7109; and 15.5 parts of CSX-200A conductive carbon black particles of the Cabot Carbon Company. The mixture was thoroughly blended, 2.5 parts of the liquid plasticizer diundecyl phthalate and 2.0 parts of dibutyltin mercaptide, Mark A of Argus Chemical Corporation, were throughly mixed and sprayed onto the dry mixture and mixing was continued until the temperature of the mixture reached 113°.

The mixture was allowed to cool to ambient and then fed to a Buss Condux Kneading Extruder and melt-extruded in the form of a pelletized molding composition. Thereafter, capacitive electronic discs were compression molded from the pelletized composition.

Mark A, dibutyltin mercaptide, has the structural formula

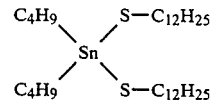

CONTROL 1

A conductive molding composition was prepared according to the procedure of Martin et al. by mixing until throughly blended: 15 parts of CSX-200A carbon black; 77.5 parts of the resin of Example 1; 0.75 part of Loxiol 7109; 1.0 part of Acryloid K-175 and 2.0 parts of Thermolite T-35. The following liquid ingredients were added by spraying onto the blended solids with mixing: 1.0 part of dibutyltin maleate stabilizer, Mark 275chemical Corporation, and 2.0 parts of diundecyl phthalate plasticizer. Mixing was continued until the temperature reached 113°. The mixture was cooled, extrusion-melted and compression molded as in Example 1.

Groups of 12 discs were tested as follows. The discs prepared in Example 1 as pressed. The control, which represents standard production discs, treated and processed according to the process disclosed in Nyman et al., U.S. Pat. No. 4,383,961, which includes washing, rinsing and drying treatments. All discs were lubricated with a doped lubricant composition as disclosed in U.S. Pat. No. 4,355,062.

The discs were tested for carrier distress and short skips as follows. Carrier distress is a measure of the distortion, loss of signal or dropout of the audio, video and color information coming from the CED. The carrier distress time is measured by adding the amount of time in seconds (but discounting intervals of less than 10 microseconds) during disc playback when the r.f. output of the player arm is less than 150 millivolts peak-to-peak, and the time when the r.f. output is above 8.6 megahertz or below 3.1 megahertz in frequency, indicating a defect. Such defects are noted by the viewer as dropouts, up to a complete loss of the picture and sound information. The present acceptable level of carrier distress for a video disc is 3 seconds in one hour of playback time.

Short skips per hour of play is the automatic skipping of two grooves by a commercial CED player caused by debris on the disc surface, locked grooves, scratches and the like. The present acceptable level of short skips is 30 per one hour of playback time.

The discs were then subjected to a high temperature-high humidity stress by being placed in a chamber maintained by 95% relative humidity and 100° F. (37.7°) for a period of 60 days and played again. The results are set forth herein below in the table. The data for the control group represents an average of five pressings of standard production discs.

TABLE

|  | Example 1 | Control |
|---|---|---|
| Carrier Distress (sec./hour of playback) | | |
| Virgin Play | | |
| Median | 0.02 | 0.25 |
| Range | 0.01–0.05 | 0.07–6.8 |
| Percent >3 sec | 0 | 3 |
| Post Stress Play | | |
| Median | 0.42 | 0.22 |
| Range | 0.05–1.96 | 0.10–137 |
| Percent >3 sec | 0 | 6 |
| Short Skips/Hour of Playback | | |
| Virgin Play | | |
| Median | 0 | 9 |
| Range | 0–7 | 0–948 |
| Percent >30 events | 0 | 19 |
| Post Stress Play | | |
| Median | 20 | 13 |
| Range | 3–76 | 0–5882 |
| Percent >30 events | 33 | 25 |

The data in the Table clearly demonstrates the superiority of the stabilizers of this invention in a CED conductive molding composition.

EXAMPLE 2

Formulations were prepared as in Example 1 utilizing as the sole stabilizer in each 3.0 parts of Mark-A and the following compounds, respectively: T-133 of M & T Chemical Company, represented by the formula

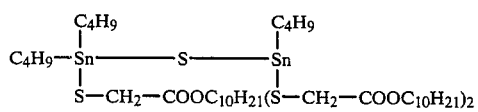

PA-1290, M & T Chemical Co., represented by the formula

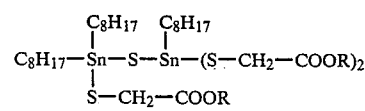

wherein R is a mixture of straight-chain alkyl radicals having from 12 to 14 carbon atoms. PA-1350, M & T Chemical Co., represented by the formula

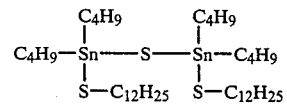

CEDs prepared from these formulations were comparable to those prepared from the formulation of Example 1 in stability and at least equal to the CEDs of Example 1 in performance properties

What is claimed is:

1. In a conductive molding composition for a capacitive electronic disc comprising from about 70 to about 85 percent by weight of a thermoplastic resin selected from the group consisting of: a homopolymer or copolymer of vinyl chloride, or a mixture thereof; and a homopolymer of styrene or an acrylic monomer, or their copolymers, from about 12 to about 20 percent by weight of finely divided conductive carbon black, from about 1 to about 5 percent by weight of compatible stabilizers, from about 0.5 to about 3 percent by weight of compatible lubricants, from about 1 to about 5 percent by weight of compatible plasticizers, and from 0 to about 4 percent by weight of compatible modifiers, the improvement wherein said stabilizer comprises at least one compound selected from those represented by the formulae

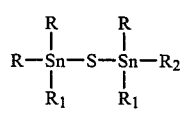

and

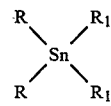

wherein R is a straight-chain alkyl radical having from 4 to 8 carbon atoms;

R₁ is —S—CH₂—COOR₃ or —S—R₃;
R₂ is R or R₁; and
R₃ is a straight-chain alkyl radical having from 8 to 18 carbon atoms.

2. An improved molding composition in accordance with claim 1, wherein said composition comprises: 78 to about 80 percent by weight of the resin; from about 14 to about 17 percent by weight of the conductive carbon black; from about 2 to about 3 percent by weight of the stabilizer; from about 0.75 to about 1.5 percent of the lubricant; from about 2 to about 3 percent by weight of the plasticizer; and from about 1 to about 1.5 percent by weight of the modifier.

3. An improved molding composition in accordance with claim 1, wherein said composition additionally contains from about 5 to about 40 percent by weight, based on the total amount of stabilizers present, of a stabilizer selected from the group consisting of an organotin maleate and dibutyltin-β-mercaptopropionate.

4. An improved molding composition in accordance with claim 3, wherein said organotin maleate is dibutyltin maleate.

5. An improved molding composition in accordance with claim 3, wherein said stabilizer consists of a compound represented by the formula

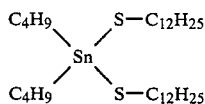

and dibutyltin-β-mercaptopropionate.

6. An improved molding composition in accordance with claim 1, wherein said stabilizer is a compound represented by the formula

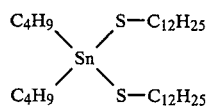

7. An improved molding composition in accordance with claim 1, wherein said stabilizer is a compound represented by the formula

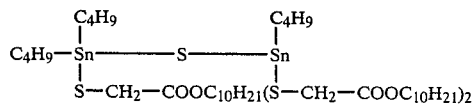

8. An improved molding composition in accordance with claim 1, wherein said stabilizer is a mixture of compounds represented by the formula

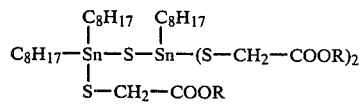

wherein R is a straight-chain alkyl radical having from 12 to 14 carbon atoms.

9. An improved molding composition in accordance with claim 1, wherein said stabilizer is a compound represented by the formula

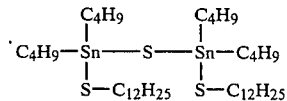

10. An improved molding composition in accordance with claim 1, wherein the resin is a homopolymer or copolymer of vinyl chloride.

11. An improved molding composition in accordance with claim 10, wherein the resin is poly(vinyl chloride) and the plasticizer is diundecyl phthalate.

12. A high density capacitance elecronic disc prepared by compression molding the improved conductive molding composition of claim 1.

13. An improved capacitance electronic disc in accordance with claim 12, wherein said disc additionally contains from about 5 to about 40 percent by weight, based on the total amount of stabilizers present, of a stabilizer selected from the group consisting of an organotin maleate and dibutyltin-β-mercapto-propionate.

14. An improved capacitance electronic disc in accordance with claim 13, wherein said stabilizer consists of a compound represented by the formula

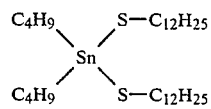

and dibutyltin-β-mercaptopropionate.

15. An improved capacitance electronic disc in accordance with claim 12, wherein said stabilizer is a compound represented by the formula

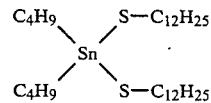

16. An improved capacitance electronic disc in accordance with claim 12, wherein said stabilizer is a compound represented by the formula

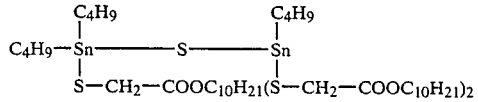

17. An improved capacitance electronic disc in accordance with claim 12, wherein said stabilizer is a compound represented by the formula

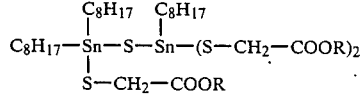

wherein R is a straight-chain alkyl radical having from 12 to 14 carbon atoms.

18. An improved capacitance electronic disc in accordance with claim 12, wherein said stabilizer is a compound represented by the formula

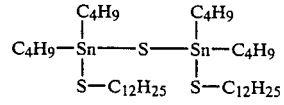

* * * * *